(No Model.)
E. HAZELTON.
CUTTING APPARATUS FOR REAPING AND MOWING MACHINES.
No. 331,968. Patented Dec. 8, 1885.
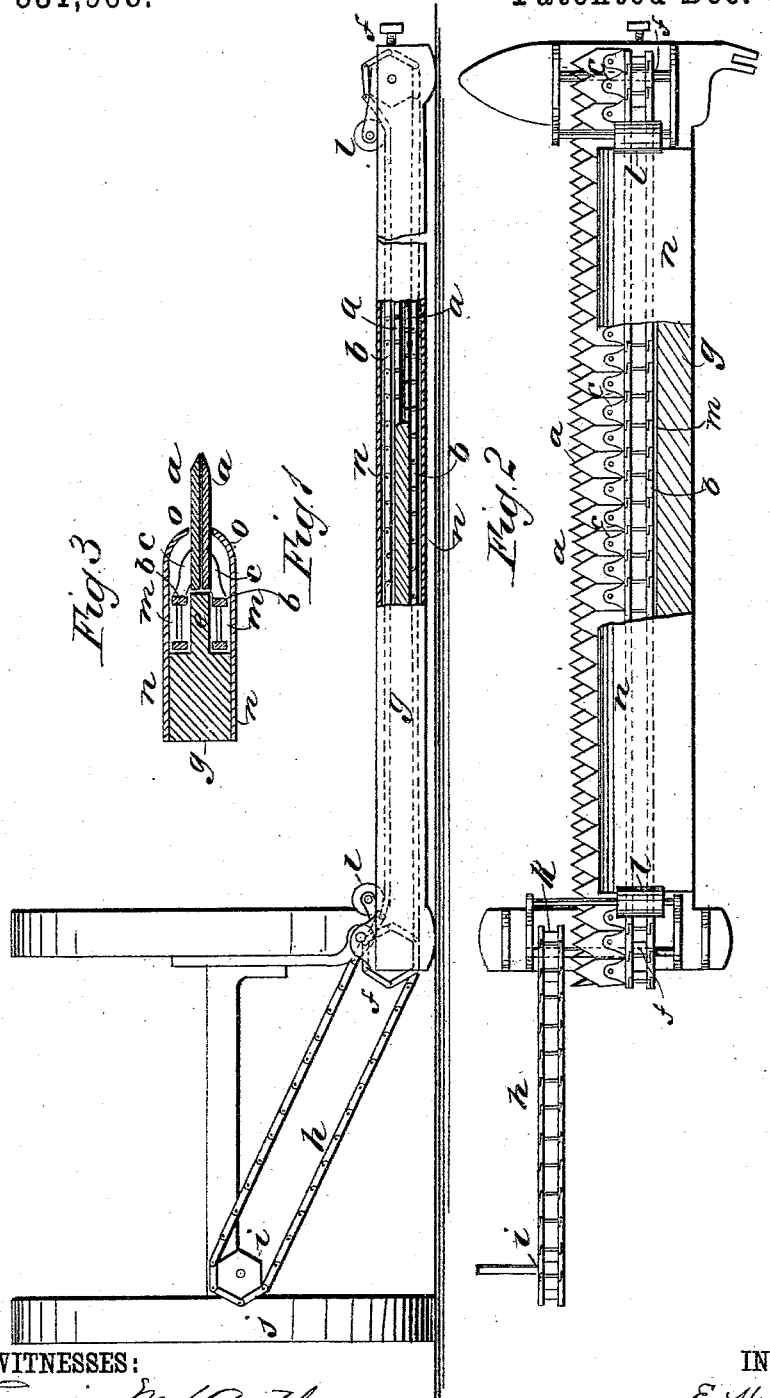
WITNESSES:
Francis McArdle.
C. Sedgwick
INVENTOR:
E. Hazelton
BY Munn & Co
ATTORNEYS.

United States Patent Office.

ELIAS HAZELTON, OF BRANTFORD, ONTARIO, CANADA, ASSIGNOR TO ISAAC HAZEL, OF SAME PLACE.

CUTTING APPARATUS FOR REAPING AND MOWING MACHINES.

SPECIFICATION forming part of Letters Patent No. 331,968, dated December 8, 1885.

Application filed May 21, 1884. Serial No. 125,037. (No model.)

*To all whom it may concern:*

Be it known that I, ELIAS HAZELTON, of Brantford, in the Province of Ontario and Dominion of Canada, have invented certain new and useful Improvements in Cutting Apparatus for Reaping and Mowing Machines, of which the following is a full, clear, and exact description.

My invention consists of the construction and arrangement of parts as will be hereinafter fully described and claimed.

Reference is to be had to the accompanying drawings, forming part of this specification, in which similar letters of reference indicate corresponding parts in all the figures.

Figure 1 is a rear elevation of the essential portions of a mowing-machine with a part of the cutter mechanism in longitudinal section, showing my improved arrangement of the knives. Fig. 2 is a plan view of the cutter mechanism and the driving-chain with a part of the cutter mechanism in horizontal section, and Fig. 3 is a transverse section of the cutter mechanism and on an enlarged scale.

I make an endless chain of knives, $a$, by constructing chain-links $b$ with a projecting bracket, $c$, from one side adapted for the attachment of a knife, $a$, to it by riveting said knife thereto in such manner that when the chain is made to run back and forth along the opposite sides of a guide-rail, $e$, of suitable thickness the surfaces of the oppositely-moving knives will run in contact with each other or so near together that the knife-edges cut against each other, which enables the knives to cut better and easier than when cutting against the edges of stationary guards in the common way. The chain-links $b$ are equal in the pitch to the width of the knives, and the knives are riveted centrally to them and to the brackets $c$, so that the knives and the links articulate coincidently to run over the sprocket-wheels $f$, located at the ends of the knife-bar $g$, to carry the cutters, the drums being revolved by a chain belt, $h$, working from a sprocket-wheel, $i$, geared with one of the truck-wheels $j$ onto a drum, $k$, on the shaft of the cutter-chain drum $f$ next to the truck. Between the cutter-chain wheels $f$ the cutter-chain $b$ runs under depressing-rollers $l$, that are to guide the upper and lower ranges of the chain of knives to the proper distance apart for causing the knives to run in sufficient proximity for cutting against each other.

The guide-rail $e$ is a thin tongue projecting from the center of the front side of the knife-bar $g$, the thickness of which is determined by the necessary substance for strength, and the thickness of the rest of the bar $g$ is to be as much greater than that of the tongue $e$ as will form rabbets $m$ suitable for the thickness of the chain $b$ to run flush with the upper and lower sides of said bar, to enable sheet-metal guards $n$ to be attached to the sides of bar $g$, for housing in the chain to confine it in its place and prevent it from being choked with grass and straw. The said guards are extended beyond the brackets $c$ and curved at the front edges, $o$, to a close joint with the cutters $a$, for confining them to their place and guiding them in their proper course. The brackets $c$, by which the knives are attached to the chain-links, are inclined toward the central plane between the two ranges of the chain sufficiently to cause the said two ranges of the knives to run together, as before stated, and this inclination will be more or less, according to the thickness of the rail $e$ and of the cutters.

Having thus described my invention, I claim as new and desire to secure by Letters Patent—

1. In a mowing or reaping machine, the endless driving-chain $b$, and the downward-curved brackets $c$, secured to one side of the links, in combination with the knives $a$, secured to the under faces of the said brackets, substantially as set forth.

2. The knife-supporting bar $g$, having the tongue $e$ on the front side, with rabbets $m$ for the chain $b$, and also having guards $n$, in combination with the endless chain of knives $a$, substantially as described.

ELIAS HAZELTON.

Witnesses:
 J. WEDGWOOD BOWLBY,
  *Of the city of Brantford, Esquire.*
 WILLIAM GREEN,
  *Of the city of Brantford, Engineer.*